S. H. & H. C. Hart,
Animal Trap.
No. 111,841. Patented Feb. 14, 1871.
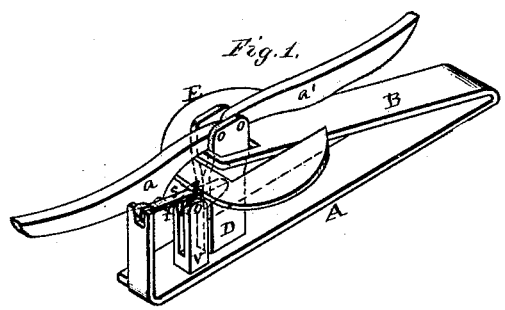
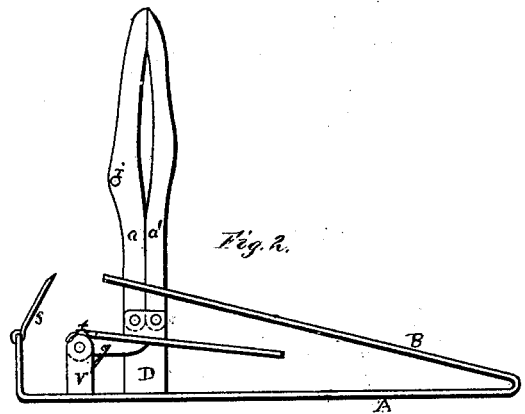
Witnesses
Jno. A. Ellis
Jas. White
Inventor
Sanford H. & Hubert C. Hart
Per
T. H. Alexander
Atty

United States Patent Office.

SANFORD H. HART AND HUBERT C. HART, OF UNIONVILLE, CONNECTICUT.

Letters Patent No. 111,841, dated February 14, 1871.

IMPROVEMENT IN ANIMAL-TRAPS.

The Schedule referred to in these Letters Patent and making part of the same.

*To all whom it may concern:*

Be it known that we, SANFORD H. HART and HUBERT C. HART, of Unionville, in the county of Hartford and State of Connecticut, have invented certain new and useful Improvements in Animal-Traps; and we do hereby declare that the following is a full, clear, and exact description thereof, reference being had to the accompanying drawing and to the letters of reference marked thereon, which form a part of this specification, in which—

Figure 1 represents a perspective view of my trap when set.

Figure 2 is a side elevation of the same with the jaws closed.

The nature of my invention consists in the construction of an animal-trap with the devices herein set forth.

A in the annexed drawing represents the base of my trap, which consists of the metal plate; one end, marked B, being bent over so as to form a spring.

The spring B extends about two-thirds of the length of base A, and has a square opening in it near its end.

Through this opening the jaws $a$ and $a'$ are made to pass, the said jaws being pivoted at their lower end in the bifurcation of upright D. The lower end of D is firmly riveted to base A.

E represents a platform, which has a projection, $g$, at its hinder end, the said projection being pivoted to the knob V on plate A.

Directly above projection $g$ is the catch $t$, formed by a narrow extension of platform E.

At the opposite end of base A, which forms spring B, A is bent at a right angle upward, and has an opening near its top, through which the outer end of trigger $s$ is allowed to pass, and then bent over, so as to form a hinge and enable the trigger to move vertically.

The jaw $a$, it will be observed, is furnished with the pin $i$, the use of which will be explained.

In setting my trap the jaw $a$ will be pressed down against the outer end of spring B until $a$ gets into a horizontal position. The trigger $s$ will then be brought over pin $i$, and its end placed under catch $t$ on platform E, upon which the bait will be fastened, as both the jaws will be in a horizontal position when the trap is set, the animal will have free access to the bait, and the moment his weight is on the platform it will tilt down and release the trigger and the pin $i$ from their position, the jaws $a$ and $a'$ will be closed with great force by the action of spring B, and the animal secured.

Having thus described our invention,

What we claim, and desire to secure by Letters Patent, is—

1. The trigger $s$, pin $i$, and platform E, combined and arranged to operate as and for the purpose set forth.

2. The jaws $a$ $a'$, spring B, platform E, trigger $s$, and pin $i$, all arranged to operate as shown.

In testimony that we claim the foregoing as our own we affix our signatures in presence of two witnesses.

SANFORD H. HART.
HUBERT C. HART.

Witnesses:
J. E. HAMILTON,
T. C. BROOKS.